(12) United States Patent
Jo et al.

(10) Patent No.: US 10,672,023 B2
(45) Date of Patent: Jun. 2, 2020

(54) APPARATUS FOR ANALYZING ADVERTISEMENT EFFECT AND METHOD OF ANALYZING ADVERTISEMENT EFFECT

(71) Applicants: Electronics and Telecommunications Research Institute, Daejeon (KR); Samsung Electronics Co., Ltd., Suwon-Si, Gyeonggi-Do (KR)

(72) Inventors: Seng Kyoun Jo, Sejong (KR); Jong Ho Lea, Gyeonggi-do (KR); Dong Min Park, Gyeonggi-do (KR); Kwang Il Hwang, Gyeonggi-do (KR); Won Ryu, Seoul (KR); Il Gu Jung, Daejeon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 528 days.

(21) Appl. No.: 15/070,595

(22) Filed: Mar. 15, 2016

(65) Prior Publication Data
US 2016/0275544 A1    Sep. 22, 2016

(30) Foreign Application Priority Data

Mar. 16, 2015   (KR) .......................... 10-2015-0035987

(51) Int. Cl.
*G06Q 30/00*   (2012.01)
*G06Q 30/02*   (2012.01)

(52) U.S. Cl.
CPC ................. *G06Q 30/0242* (2013.01)

(58) Field of Classification Search
None
See application file for complete search history.

(56) References Cited

U.S. PATENT DOCUMENTS

| | | |
|---|---|---|
| 2003/0110080 A1 | 6/2003 | Tsutani et al. |
| 2010/0280876 A1 | 11/2010 | Bowra |
| 2012/0101903 A1 | 4/2012 | Oh et al. |
| 2012/0271639 A1 | 10/2012 | Hanson |
| 2014/0194394 A1 | 7/2014 | Henry |
| 2014/0308932 A1 | 10/2014 | Lee et al. |
| 2015/0170210 A1* | 6/2015 | Rhee ................. G06Q 30/0241 705/14.64 |
| 2016/0210666 A1* | 7/2016 | Ataka ................ G06Q 30/0255 |
| 2017/0228761 A1* | 8/2017 | Goel ..................... G06Q 30/02 |

FOREIGN PATENT DOCUMENTS

| | | |
|---|---|---|
| JP | 2007-287170 A | 11/2007 |
| JP | 2012-123727 A | 6/2012 |
| KR | 2009-0078396 A | 7/2009 |
| KR | 2011-0013967 A | 2/2011 |
| KR | 2012-0075612 A | 7/2012 |
| KR | 2014-0023788 A | 2/2014 |
| KR | 2014-0078010 A | 6/2014 |
| WO | 2013086357 A2 | 6/2013 |

* cited by examiner

*Primary Examiner* — Alvin L Brown
(74) *Attorney, Agent, or Firm* — Sughrue Mion, PLLC (57) ABSTRACT

The present disclosure relates to an advertisement effect analysis apparatus and an advertisement effect analysis method. Specifically, the advertisement effect analysis method collects an advertisement viewing history of a user, determines a display state of an advertisement displayed to a user and a user response, and analyzes an effect of the advertisement displayed to the user based on a determination result.

21 Claims, 7 Drawing Sheets

| AD Content ID | Smart TV ID | AD Start Time | AD Select Time | User Event #1 | Event Value |
|---|---|---|---|---|---|
| | | AD Start Time | | User Event #2 | Event Value |
| | | | | ... | |
| | | | | User Event #N | Event Value |

| Advertisement name | ID | Index 1 | Index 2 | ... | AdEffect$_{score}$ | Negative |
|---|---|---|---|---|---|---|
| Advertisement #1 | Ad_001 | 30.5 | 20.5 | ... | 65.7 | No |
| ... | ... | ... | ... | ... | ... | ... |
| Advertisement #N | Ad_N | 39.5 | 63.4 | ... | 55.8 | Yes |

APPARATUS FOR ANALYZING ADVERTISEMENT EFFECT AND METHOD OF ANALYZING ADVERTISEMENT EFFECT

CROSS-REFERENCE TO RELATED APPLICATION

This application claims the priority benefit of Korean Patent Application No. 10-2015-0035987 filed on Mar. 16, 2015, in the Korean Intellectual Property Office, the disclosure of which is incorporated herein by reference.

BACKGROUND

1. Technical Field

Embodiments relate to an advertisement effect analysis apparatus and an advertisement effect analysis method, and more particularly to an apparatus and a method for analyzing an effect of an advertisement displayed to a user by analyzing an advertisement viewing history of the user.

2. Description of Related Art

Recently, smart TVs accommodate Internet-based content, generally enabled in personal computers (PCs), based on characteristics of conventional TVs to become new mainstream media service providers. Smart TVs display a variety of advertisements differentiated from those of the same content provided to users without variation by accommodating Internet-based content. Smart TV advertising is used by advertisers for marketing to meet users' needs and to induce active content consumption, and advertisers intend to measure information on user interest and satisfaction with respect to advertisements thereof among a variety of advertisements displayed to users.

A current advertisement effect measurement method is similar to a method of surveying audience ratings, in which a people meter is generally used to collect and analyze user information, thereby measuring the effect of an advertisement. That is, the advertisement effect measurement method employs return path data for advertisement effect measurement in a communication network-combined TV environment.

As an index for measurement, a display count indicating the number of simple displays, the number of hits indicating the number of inputs via a remote controller, click-through rate (CTR) indicating the number of clicks, and the like are used independently. Recently, there is introduced a technique for advertisement effect measurement which employs determining the presence of a user, measuring a viewing time, and measuring how long an advertisement catches user's attention using a camera attached to a TV.

However, such an advertisement effect measurement method is used merely to show an index to indicate a user pattern with respect to a displayed advertisement but has difficulty in showing actual user involvement in the advertisement displayed to the user.

Thus, there is needed a method for analyzing an advertisement effect differentiated depending on a situation by using a weighting based on a user response to an advertisement displayed to a user.

SUMMARY

An aspect may provide an advertisement effect analysis apparatus and an advertisement effect analysis method which analyze an advertisement viewing history of a user from a user device to analyze user involvement in a displayed advertisement.

Another aspect may also provide an advertisement effect analysis apparatus and an advertisement effect analysis method which analyze an effect of an advertisement by applying a weighting based on importance of a display size of the advertisement, a display time, and a user response according to the advertisement viewing history.

According to an aspect, there is provided a method of analyzing an advertisement effect performed by an advertisement effect analysis apparatus, the method including collecting an advertisement viewing history of a user from a user device; determining a display state of an advertisement based on the collected advertisement viewing history and a user response based on the display state; and analyzing an effect of the advertisement displayed to the user corresponding to a determination result.

The determining may include determining the display state of the advertisement using a display size of the advertisement displayed on a screen of the user device and a display time based on the display size of the advertisement.

The determining may include enlarging the display size of the advertisement by adjusting an advertising area on the screen on which the advertisement is displayed when the displayed advertisement is selected by the user.

The determining may include determining an advertisement display degree according to the display size and display time based on a size of the screen of the user device and a play time of the advertisement.

The determining may include determining a user response to the advertisement using input information for manipulating an advertisement played according to the display state.

The determining may include determining a user response according to a preset range using input information indicating a variation in sound based on the sound output from the played advertisement.

The analyzing may include analyzing an effect of the advertisement in view of a weighting based on importance of the display state of the advertisement and the user response according to a result.

According to another aspect, there is provided a method of analyzing an advertisement effect performed by an advertisement effect analysis apparatus, the method including determining a display state of an advertisement displayed on a screen of a user device by collecting an advertisement viewing history of a user; determining a user response indicating involvement in the advertisement corresponding to the determined display state of the advertisement; and analyzing an effect of the advertisement displayed to the user corresponding to the display state and the user response.

The determining of the display state may include determining the display state of the advertisement using a display size of the advertisement displayed on a screen of the user device and a display time based on the display size of the advertisement.

The determining of the display state may include enlarging the display size of the advertisement by adjusting an advertising area on the screen on which the advertisement is displayed when the displayed advertisement is selected by the user.

The determining of the display state may include determining an advertisement display degree according to the display size and display time based on a size of the screen of the user device and a play time of the advertisement.

The determining of the user response may include determining a user response to the advertisement using input information for manipulating an advertisement played according to the display state.

The determining of the user response may include determining a user response according to a preset range using input information indicating a variation in sound based on the sound output from the played advertisement.

The analyzing of the user response may include analyzing an effect of the advertisement in view of a weighting based on importance of the display state of the advertisement and the user response according to a result.

According to still another aspect, there is provided an apparatus for analyzing an advertisement effect, the apparatus including a receiver configured to collect an advertisement viewing history of a user from a user device; and a processor configured to determine a display state of an advertisement based on the collected advertisement viewing history and a user response based on the display state and to analyze an effect of the advertisement displayed to the user.

The processor may determine the display state of the advertisement using a display size of the advertisement displayed on a screen of the user device and a display time based on the display size of the advertisement.

The processor may determine a user response to the advertisement using input information for manipulating an advertisement played according to the display state.

According to yet another aspect, there is provided an advertisement effect analysis apparatus performing an advertisement effect analysis method which includes a processor, wherein the processor determines a display state of an advertisement displayed on a screen of a user device by collecting an advertisement viewing history of a user, determines a user response indicating involvement in the advertisement corresponding to the determined display state of the advertisement, and analyzes an effect of the advertisement displayed to the user corresponding to the display state and the user response.

The processor may determine the display state of the advertisement using a display size of the advertisement displayed on a screen of the user device and a display time based on the display size of the advertisement.

The processor may determine a user response to the advertisement using input information for manipulating an advertisement played according to the display state.

BRIEF DESCRIPTION OF THE DRAWINGS

These and/or other aspects, features, and advantages of the disclosure will become apparent and more readily appreciated from the following description of embodiments, taken in conjunction with the accompanying drawings of which.

DETAILED DESCRIPTION

Reference will now be made in detail to embodiments of the present disclosure, examples of which are illustrated in the accompanying drawings, wherein like reference numerals refer to the like elements throughout. Embodiments are described below to explain the present disclosure by referring to the figures.

Figure 1:
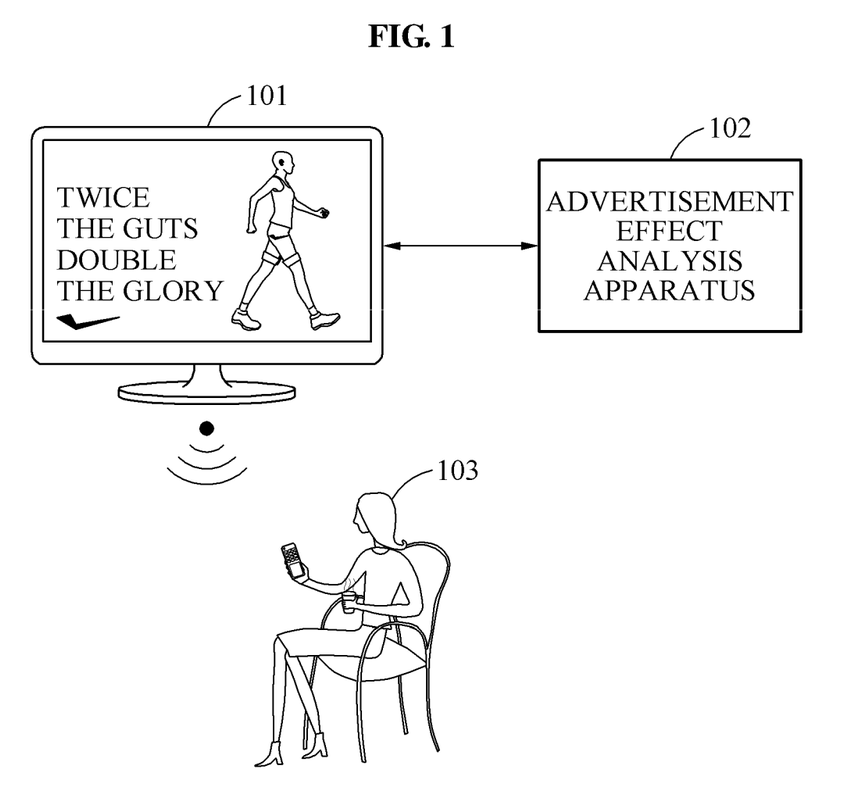
FIG. 1 illustrates an overall configuration of an advertisement effect analysis apparatus according to an example embodiment.

FIG. 1 illustrates an overall configuration of an advertisement effect analysis apparatus according to an example embodiment.

Before describing the advertisement effect analysis apparatus 102, an advertising manager which manages the advertisement effect analysis apparatus 102 may perform a series of advertisement registration procedures to analyze an effect of an advertisement displayed to a user. Specifically, the advertising manager may perform a process of registering an advertisement that an advertiser or advertising agency providing the advertisement intends to display to the user through a user device. Here, the process of registering the advertisement may refer to a process of making an advertising contract regarding certain details, for example, a contract for specifying a number of advertisement display times, an advertisement display period, and a number of advertisement display times, which are desired by the advertiser or advertising agency.

Accordingly, the advertising manager may perform a contract process of inputting information on the advertisement that the advertiser or advertising agency intends to display to the user through the user device online or offline. Information on the contract made between the advertising manager and the advertiser or advertising agency may partly be used as information for estimating the effect of the advertisement displayed through the user device.

That is, the advertisement effect analysis apparatus 102 may measure the effect of the displayed advertisement on the basis of a frequency, time, and interval of the advertisement displayed through the user device based on part of the information on the contract, such as details, an advertising target, an advertising period or count, and created advertising content of the advertisement contracted to be provided through the user device.

Referring to FIG. 1, when an advertisement is displayed through the user device, the advertisement effect analysis apparatus 102 may measure an effect of the displayed advertisement and deliver a measurement result to the advertiser or advertising agency. Further, in measuring the effect of the advertisement, the advertisement effect analysis apparatus 102 may input a weighting in view of importance of each index to set a profile of the advertisement.

The advertisement effect analysis apparatus 102 may analyze an effect of an advertisement displayed to a user based on an advertisement viewing history of the user. Specifically, the advertisement effect analysis apparatus 102 may collect an advertisement viewing history of a user from a user device 101. Here, the user device 101 may be a device including a display capable of displaying an advertisement. For example, the user device 101 may include various forms of devices, such as a mobile phone, a tablet computer, a desktop computer, and a smart TV. Further, the advertisement effect analysis apparatus 102 may be integrated with the user device in a form of an application or be configured as an external device connectable to the user device.

The advertisement effect analysis apparatus 102 may determine a display state of the advertisement displayed through the user device 101 and a user response based on the display state on the basis of the advertisement viewing history. Here, the display state and the user response may be used as indexes for analyzing the effect of the advertisement displayed to the user. The indexes may be changed or extended later based on the advertisement displayed to the user.

That is, when the advertisement is displayed to the user, the advertisement effect analysis apparatus 102 may analyze a form in which the advertisement is displayed and the effect of the advertisement displayed to the user in view of the user response to the display advertisement.

The display state of the advertisement may include a display size of the advertisement displayed on a screen of the user device and a display time based on the display size of the advertisement. That is, the display state of the advertisement may indicate a display size per size of an advertising area in which an advertisement is displayed on the screen of the user device and a display time in which the advertisement is displayed in set display size.

Here, the advertisement may be a still-image advertisement or a video advertisement, and the display size of the advertisement is adjustable according to a user selection. That is, the advertisement may adjust the display size based on the size of the advertising area and be played in the adjusted display size. Here, the advertisement may adjust the display size largely by two methods.

According to a first embodiment, the advertisement may be displayed on the screen of the user device, changing the display size to a first size or a second size based on a screen size of the user device.

Specifically, the advertisement may be displayed on the screen in the first size based on the screen size of the user device. Here, the first size may be a readjusted size according to an aspect ratio of the user device. That is, the advertisement may be displayed on the screen in the first size according to the aspect ratio of the user device, which allows the user to concentrate on the advertisement when viewing the advertisement.

Subsequently, the advertisement is selectable according to user interest. The advertisement may be displayed on the screen, changing the display size from the first size to the second size according to a user selection. Here, the second size may be an enlarged size corresponding to the aspect ratio of the user device. That is, when the user chooses an enlarged view according to user interest, the advertisement may be displayed on the screen in the second size corresponding to a full screen of the user device. That is, the advertisement may change the size to the first size or second size and be displayed by stages on the screen of the user device via two stages.

According to a second embodiment, the advertisement may arbitrarily adjust the size based on user interest according to a functional internally provided by the user device 101.

With active studies and development of image representation techniques in recent years, techniques for controlling content displayed on the user device 101 are also steadily advancing. That is, the user device 101 provides a variety of content functions, such as smart touching, smart sensing, and smart sound recognition, according to user selection and control.

Thus, an advertisement may be selected based on user interest and be adjusted to have a random size determined suitable for the user to view the advertisement according to user control. That is, the size of the advertisement may be adjusted variously through the content functions, such as smart touching, smart sensing, and smart sound recognition, to meet user requirements.

The user response may refer to user behavior, such as interest level or involvement of the user in the advertisement displayed on the screen of the user device 101. Here, the advertisement effect analysis apparatus 102 may determine a user response based on input information input by the user to determine a user response. That is, the advertisement effect analysis apparatus 102 may receive a signal through a peripheral 104 connectable to the user device 101 and determine a user response based on input information according to the received signal.

The advertisement effect analysis apparatus 102 may analyze the effect of the advertisement displayed to the user corresponding to a determination result on the basis of the display state of the advertisement based on the advertisement viewing history and the user response based on the display state.

Here, the advertisement effect analysis apparatus 102 may apply a different weighting corresponding to each index based on the display state and the user response and compare profiles of the advertisement based on the applied weighting of each index and the advertising contract, thereby analyzing the effect of the advertisement. A weighting is a value indicating importance of each index in analyzing advertisement effects, which may be set based on input information or by an apparatus manager upon the advertising contract with the advertiser or advertising agency Ultimately, the advertisement effect analysis apparatus 102 may determine information delivery capability of the advertisement displayed to the user and user involvement based on the information delivery capability, thereby analyzing the effect of the advertisement. That is, the advertisement effect analysis apparatus 102 may infer an impact of the advertisement on the user based on the information delivery capability or an objective result of evaluating a target of the advertisement through the analyzed effect.

Further, the advertiser or advertising agency may measure the effect of the advertisement according to desired criteria thereof and set a profile of the advertisement accordingly, thereby delivering information on the advertisement via indirect communication with the user, not in a unilateral manner.

Figure 2:
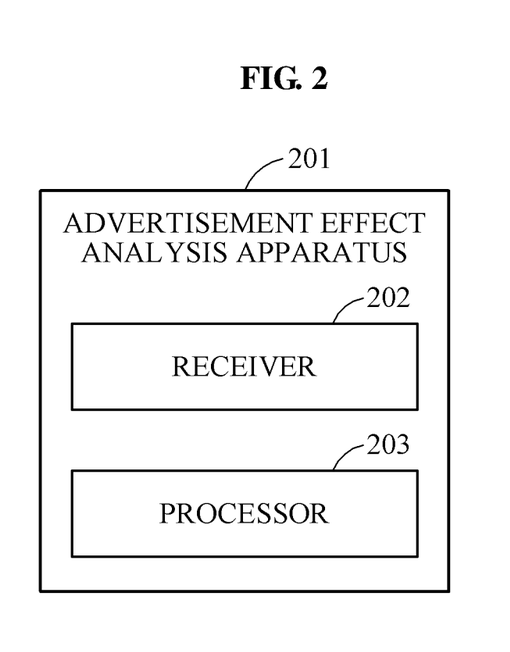
FIG. 2 illustrates a detailed configuration of an advertisement effect analysis apparatus according to an example embodiment.

FIG. 2 illustrates a detailed configuration of an advertisement effect analysis apparatus according to an example embodiment.

The advertisement effect analysis apparatus 201 may measure an effect of an advertisement displayed to a user on the basis of indexes respectively based on i) a display size of the advertisement according to a display state of the advertisement, ii) a display time according to the display size of the advertisement, and iii) a user response to the advertisement. The advertisement effect analysis apparatus 201 may perform the following operations in order to measure the effect of the advertisement on the basis of the respective indexes.

Referring to FIG. 2, the advertisement effect analysis apparatus 201 may include a receiver 202, a processor 203, and a transmitter 204.

Specifically, the receiver 202 may collect an advertisement viewing history of a user from a user device. The advertisement viewing history may include information for identifying an advertisement displayed to the user and input information input by the user corresponding to the displayed advertisement. For example, the advertisement viewing history may include an identifier (ID) for identifying an advertisement, an advertisement start time, an advertisement end time, and input information input by the user.

Here, the receiver 202 may collect a separate advertisement viewing history corresponding to each advertisement displayed through the user device. For example, the receiver 202 may collect an advertisement viewing history of advertisement A corresponding to advertisement A and an advertisement viewing history corresponding to advertisement B.

The receiver 202 may collect an advertisement viewing history of each advertisement after a time the advertisement is displayed. The receiver 202 may collect an advertisement viewing history of an advertisement even when the user arbitrarily suspends the advertisement after a compulsory display time set for the advertisement or the advertisement is played to the end.

For example, it may be assumed that advertisement A is an advertisement compulsorily displayed before user desired information is provided, which is compulsorily played for 5 seconds to be stopped. The receiver 202 may collect the advertisement viewing history of advertisement A even when the user stops playing advertisement A within 5 seconds or the advertisement continues to be played even in 5 seconds.

Further, the receiver 202 may collect an advertisement viewing history, further including user input information which is input in processes of starting and ending an advertisement in playing the advertisement. Here, the user input information may be an operation for controlling playback of the advertisement, which may be an index used to predict a user response.

The processor 203 may determine a display state of an advertisement based on a collected advertisement viewing history and a user response based on the display state. Specifically, the processor 203 may determine a display size of an advertisement displayed on a screen of the user device based on the display state of the advertisement and a display time based on the display size of the advertisement.

The processor 203 may analyze an effect of the advertisement based on a determination result. That is, the processor 203 may measure the effect of the advertisement using respective indexes based on the display size of the advertisement based on the state of the advertisement, the display time of the advertisement, and the user response.

The processor 203 may store the advertisement viewing history of the user collected through the receiver 202 and the analyzed advertisement effect in a database. By storing the advertisement viewing history and the advertisement effect in the database, results of analyzing advertisement effects calculated based on the stored advertisement viewing histories may be statistically complied according to a particular condition (for example, household/advertisement/advertiser, etc.) and be provided to an advertiser or platform manager.

A configuration for measuring advertisement effects according to each index will be described in detail with reference to FIGS. 4 to 6.

Figure 3:
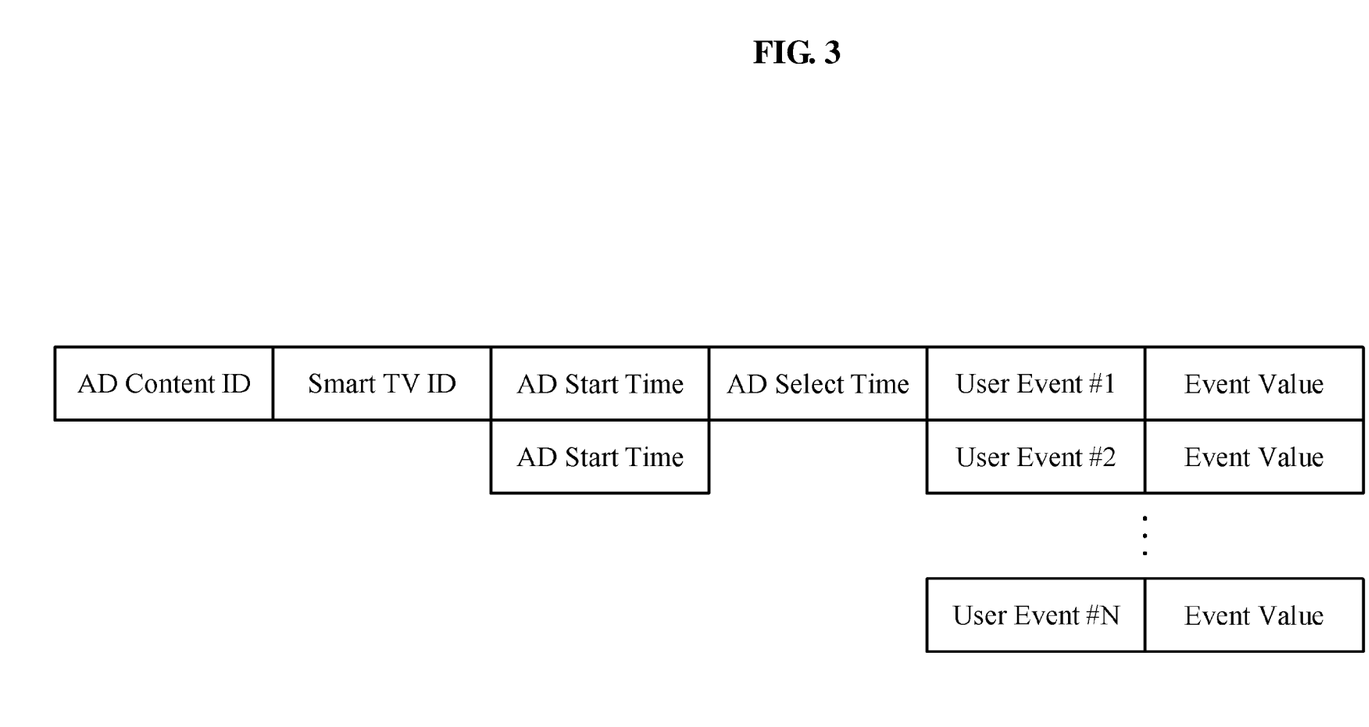
FIG. 3 illustrates a detailed configuration of an advertisement viewing history of a user according to an example embodiment.

FIG. 3 illustrates a detailed configuration of an advertisement viewing history of a user according to an example embodiment.

Referring to FIG. 3, an advertisement effect analysis apparatus may receive an advertisement viewing history of a user from a user device. Here, the advertisement viewing history is for measuring an effect of each advertisement and may include information for identifying an advertisement displayed to a user and input information input by the user corresponding to the displayed advertisement.

Specifically, the advertisement viewing history may include an ID for identifying an advertisement (AD Content ID), an ID of a user device (Smart TV ID), an advertisement start time (AD Start Time), an advertisement end time (AD End Time), a time an advertisement is selected so that an advertising area is enlarged (AD Select Time), and input information input by a user via a peripheral device (User Event).

Here, the input information may include a number of times a button of a peripheral is pressed (User Event) and a value occurring in each time (Event Value). Specifically, the input information may be information input by the user through a remote controller (peripheral) while an advertisement is being played. For example, the input information may be information on a volume up or down event or channel up or down event via the remote controller and on a change in value occurring upon each input while the advertisement is being played. The input information may be used as data to indirectly determine user interest in the advertisement.

The AD Select Time may refer to a time when the user selects the advertisement and be indicated differently according to a user selection on a screen configuration of the user device on which the advertisement is played. Specifically, an advertisement provided on the user device may primarily provide basic information, such as a thumbnail and an image, through an advertisement list. Here, when the user selects an advertisement on the list, which means that the user wants detailed information on the advertisement, detailed information on the advertisement, such as a video and a URL, may be provided secondarily.

Here, the user may arbitrarily select an advertisement among advertisements displayed on the screen of the user device, and the AD Select Time may be different, for example, 1 second or 10 seconds, depending on a user selection.

Thus, the AD Select Time may be indicated differently according to a user selection on the screen configuration of the user device. Since selecting an advertisement by the user may be interpreted as a high interest of the user in the advertisement, the AD Select Time may be used as an index based on an advertisement play time.

Further, when the user selects a displayed advertisement, the advertisement effect analysis apparatus may adjust the advertising area on the screen displaying the advertisement at the advertisement selected time to enlarge the display size of the advertisement. That is, the advertisement effect analysis apparatus may change the display state of the advertisement according to a response of the user viewing the advertisement and analyze an effect of the advertisement accordingly.

Figure 4:
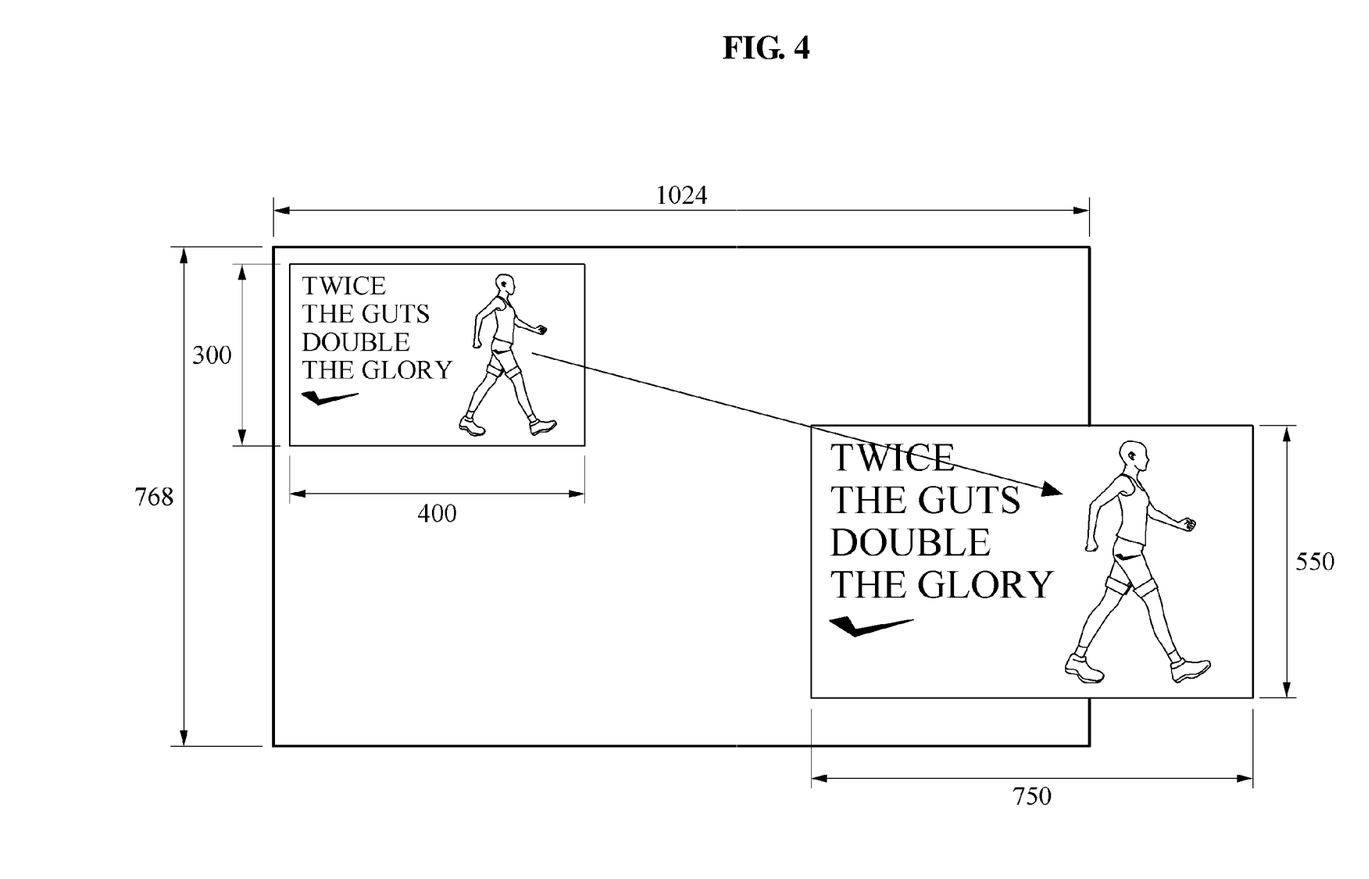
FIG. 4 illustrates a display state of an advertisement according to an example embodiment.

FIG. 4 illustrates a display state of an advertisement according to an example embodiment.

Referring to FIG. 4, an advertisement effect analysis apparatus may analyze a display size of an advertisement based on a display state of the advertisement and a display time based on the display size of the advertisement in order to measure an effect of the advertisement.

Specifically, the advertisement may be displayed through an advertising area for displaying an advertisement which is an area forming a screen of a user device. Here, the advertisement may be displayed through a different advertising area depending on a screen interface provided by the user device. Hereinafter, for understanding of the disclosure, a display state of an advertisement will be described assuming that the advertisement is provided through a 400×300-pixel advertising area on a user device with a size of 1024×768 pixels and the advertisement is provided through an enlarged 750×550-pixel advertising area according to a user selection.

The advertisement effect analysis apparatus may receive inputs of a display size and display time of an advertisement to be displayed upon an advertising contract with an advertiser or advertising agency. Here, the advertisement effect analysis apparatus may determine that the advertisement is displayed to the user to a greater degree as the advertising area of the screen on which the advertisement is displayed is larger or the advertisement is played for a longer time in proportion to the display size and the display time of the advertisement. Further, the advertisement effect analysis apparatus may determine that such a proportional relationship is applied the same to an effect of the advertisement.

Thus, the advertisement effect analysis apparatus may indicate the display state of the advertisement in view of the display size and display time of the advertisement and accordingly identify the degree to which the advertisement is displayed to the user. The advertisement display degree may be represented by Equation 1.

Display degree=(advertising area size×display time)+
(enlarged advertising area size×display time)/
(user device screen size×advertisement length)  [Equation 1]

Referring to Equation 1, the advertisement display degree may be inferred based on a screen configuration of the user device according to the display state of the advertisement. That is, the advertisement display degree may be analyzed by dividing a sum of the 400×300-pixel advertising area multiplied by a time the advertisement is played in the advertising area and the 750×550-pixel advertising area multiplied by a time the advertisement is played in the advertising region by a 1024×768-pixel screen configuration of the user terminal multiplied by a total advertisement playback time, thereby identifying information on the advertisement actually displayed to the user.

Ultimately, the advertisement effect analysis apparatus may divide the advertising area and the enlarged advertising area and consider the times the advertisement is played in the respective areas, thereby subdividing user responses to the advertisement. The advertisement effect analysis apparatus may obtain objective effects of the advertisement according to the subdivided user responses.

For example, in Equation 1, when the advertisement has a total playback time of 20 seconds, is played in the 400×300-pixel advertising area for 12 seconds, and is played in the 750×550-pixel advertising area for 7 seconds, the advertisement display degree is calculated as follows. Here, the total playback time of the advertisement and information on the screen configuration (size) of the user device may be obtainable through a profile of the advertisement.

The display time in the 400×300-pixel advertising area may be calculated by a value of AD Select Time−AD Start Time from the advertisement viewing history, and the display time in the 750×550-pixel advertising area may be calculated by a value of AD End Time−AD Select Time. In the present disclosure, the display degree is calculated as follows, for example, in a case where the advertisement is provided in two sizes (400×300 pixels and 750×550 pixels). In a case of a different UI of the user device, the following method may also be used to infer the display degree in view of the display size and time. Equation 2 is an example of calculating the advertisement display degree.

Display degree={(400×300×12 s)+(750×550×7 s)}/
1024×768×20 s=0.2719(27.19%)  [Equation 2]

The advertisement display degree may be expressed as 1 when the advertisement is played in the full screen size from an advertisement start time to an advertisement end time. Thus, the advertisement display degree represented by Equation 2 may be used as an index to measure how effectively the advertisement is delivered and used to compare how effectively the advertisement is displayed with other advertisements.

Figure 5:
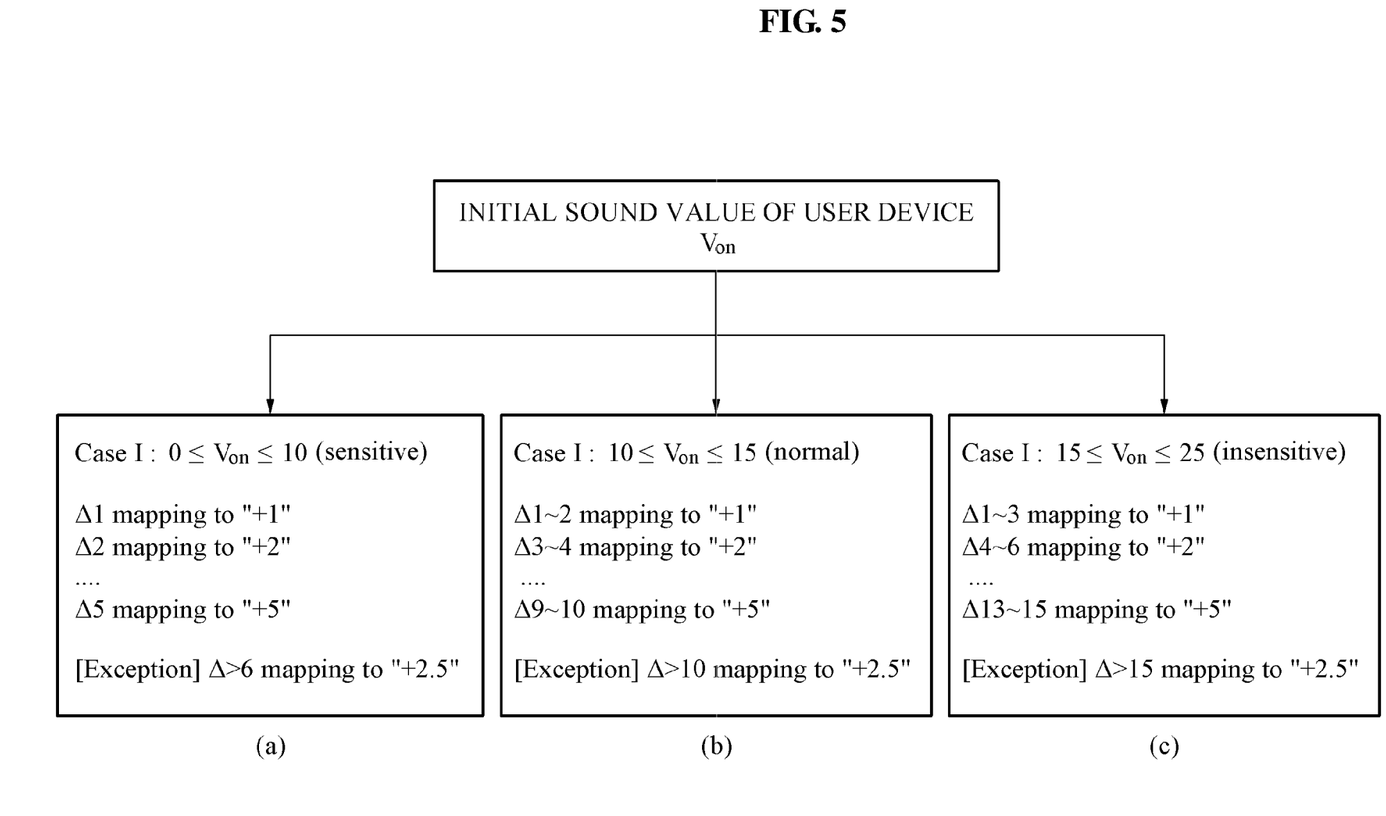
FIG. 5 illustrates a user response to an advertisement according to an example embodiment.

FIG. 5 illustrates a user response to an advertisement according to an example embodiment.

Referring to FIG. 5, an advertisement effect analysis apparatus may determine a user response to estimate user interest in an advertisement in addition to advertisement display information based on an advertisement display state. That is, the advertisement effect analysis apparatus may determine user interest in a displayed advertisement, which is a main purpose of the advertiser or advertising agency. Here, the advertisement effect analysis apparatus may determine a user response through an indirect method using input information input by a user, instead of a direct method using an online or offline survey.

To this end, the advertisement effect analysis apparatus may determine a user response to an advertisement using an input through a remote controller that is a peripheral connected to a user device. The remote controller is a representative user interface for the user device, and a record of remote controller manipulation is stored in the user device and thus may be easily analyzed. For example, the user may generate input information by turning the volume up or down with respect to a played advertisement through the remote controller. When the user turns the volume up while the advertisement is being played, the advertisement effect analysis apparatus may determine that the user is interested in the advertisement. When the user turns the volume down, the advertisement effect analysis apparatus may determine that the user is not interested in the advertisement.

FIG. 5 illustrates an example of indirectly measuring a user response, in which user interest in an advertisement may be indirectly measured through a volume change based on an initial sound value of a user device. That is, the advertisement effect analysis apparatus may collect a set initial sound value ($V_{on}$) before receiving input information from a user from the user device. Here, the initial sound value ($V_{on}$) is used to identify a volume state sensed when the user views an advertisement in a preset sound range, and a differentiated value may be allocated to a change in volume based on the initial sound value ($V_{on}$).

Referring to (a) of FIG. 5, the initial sound value of the user device may be set to $0 \leq V_{on} \leq 10$, which may be determined to be a slightly low sound range for the user. That is, the user views the user device set to $0 \leq V_{on} \leq 10$ may be determined sensitive to the volume.

Thus, whenever the volume is turned up by '1' based on input information input through the remote controller, the advertisement effect analysis apparatus may assign a weighting representing '1.' That is, the advertisement effect analysis apparatus may assign a direct weighting corresponding to the input information by the user in which the sound is set to a low value. That is, the advertisement effect analysis apparatus may increase a weighting in proportion to the input information by the user.

Referring to (b) of FIG. 5, the initial sound value of the user device may be set to $10 \leq V_{on} \leq 15$, which may be determined to be a normal sound range for the user. That is, the user views the user device set to $10 \leq V_{on} \leq 15$ may be determined not to be sensitive to the volume and not to listen at high volumes.

Thus, whenever the volume is turned up by '2' based on input information input through the remote controller, the advertisement effect analysis apparatus may assign a weighting representing '1.' That is, the advertisement effect analysis apparatus may assign a weighting such that the user having the normal sound range does not respond to a relatively loud sound.

Referring to (c) of FIG. 5, the initial sound value of the user device may be set to $15 \leq V_{on} \leq 25$, which may be determined to be a slightly high sound range for the user. That is, the user views the user device set to $15 \leq V_{on} \leq 25$ may be determined to be insensitive to the volume.

Thus, whenever the volume is turned up by '3' based on input information input through the remote controller, the advertisement effect analysis apparatus may assign a weighting representing '1.' That is, the advertisement effect analysis apparatus may assign an indirect weighting corresponding to the input information by the user since the user is insensitive to a sound. That is, the advertisement effect analysis apparatus may assign a weighting corresponding to occurrence of input information representing a value, instead of increasing a weighting in proportion to the input information by the user.

Here, a Von range may be set differently depending on a smart TV device or be set by a smart TV service provider based on a user experience.

An index to measure the effect of the advertisement may be calculated below based on the above three set ranges. For example, in the range of $10 \leq V_{on} \leq 15$, when the user turns up the volume twice by +3 and +1 with respect to input information input while viewing the advertisement, the advertisement effect analysis apparatus may calculate a user response based on a volume change by Equation 3.

User response=$\{(+2)+(+1)\} \times 0.2/1+1=0.3$ [Equation 3]

Referring to Equation 3, by applying a weighting to each index with respect to the calculated effect of the advertisement according to importance of the index, a level of an overall advertisement effect may be provided through a score of an advertisement effect measurement result as follows, which may be represented by Equation 4.

$$AdEffect_{score} = \sum_{i=1}^{N} \alpha_i \cdot Index_i.$$ [Equation 4]

An effect (AdEffect$_{score}$) of each advertisement may be analyzed using a weighting for each index of a user (a) with respect to the advertisement (i). For example, an effect of each advertisement may be analyzed using weightings for respective indexes indicating an advertisement display state of a user (a) and a user response with respect to the advertisement (i).

Ultimately, the effect of the advertisement may be converted into a score in the hundred according to the advertisement display state and user response by Equation 5.

AdEffect$_{score}$=$(0.5 \times 0.2719+0.5 \times 0.3) \times 100=28.59$ [Equation 5]

The advertisement effect analysis apparatus may need to consider an index other than the above indexes. Specifically, the advertisement effect analysis apparatus may experience a case where the user immediately stops an advertisement after the lapse of a compulsory display time set for each advertisement. In this case, although the user stops the advertisement, the advertisement effect analysis apparatus determines that the advertisement is played for a certain period of time based on a degree to which the advertisement is displayed and calculates a value for an index considering a playback time.

Here, the advertisement effect analysis apparatus may consider that the advertisement is displayed to the user but actually has a negative impact on the user. That is, when the user receives an input of an advertisement stop within a specific time, for example, two seconds ($0 \leq t < 2$), after the compulsory display time, the advertisement effect analysis apparatus may separately manage this case and separately provide an advertisement effect measurement result to a desiring advertising or platform manager.

Figure 6:
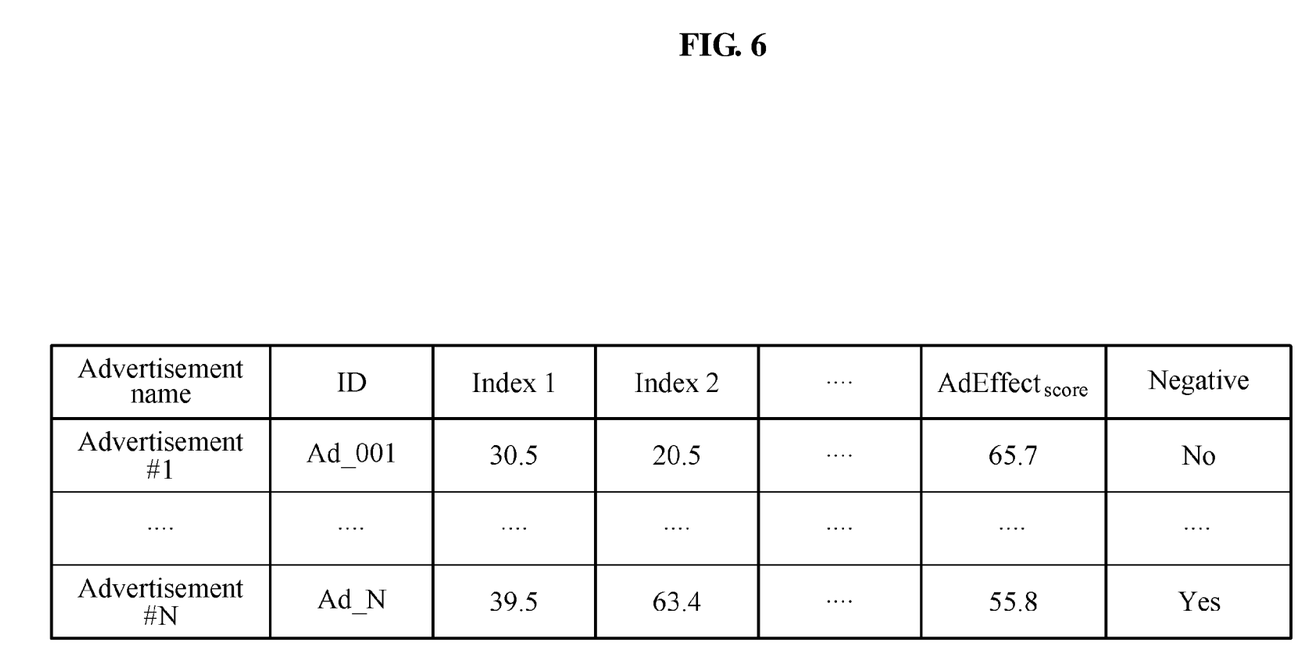
FIG. 6 illustrates an operation of analyzing an effect of an advertisement according to a result of an advertisement displayed to a user according to an example embodiment.

FIG. 6 illustrates an operation of analyzing an effect of an advertisement according to a result of an advertisement displayed to a user according to an example embodiment.

Referring to FIG. 6, an advertisement effect analysis apparatus may collect an advertisement viewing history of a user and an effect of an advertisement based on the collected advertisement viewing history. Here, the advertisement effect analysis apparatus may consider importance of each index according to an advertiser or advertising agency based on an advertisement profile provided by the advertiser or advertising agency providing the displayed advertisement. That is, the advertisement effect analysis apparatus may analyze an effect of the advertisement based on the importance of each index with respect to an advertisement display state or user response in displaying the advertisement to the advertiser or advertising agency providing the advertisement.

That is, the advertisement effect analysis apparatus may analyze the effect of the advertisement according to the user based on the advertisement display state and the user response calculated through FIGS. 4 and 5. The advertisement effect analysis apparatus may divide advertisement effects into positive effects and negative effects based on a result of analyzing the effects of the advertisement.

Further, the advertisement effect analysis apparatus may provide how effective the advertisement from the advertiser or advertising agency is to the user using the analysis result. Further, the analysis result may be used as data used to recommend an advertisement to the user and accordingly be used an element to improve accuracy rate of a target advertisement.

Figure 7:
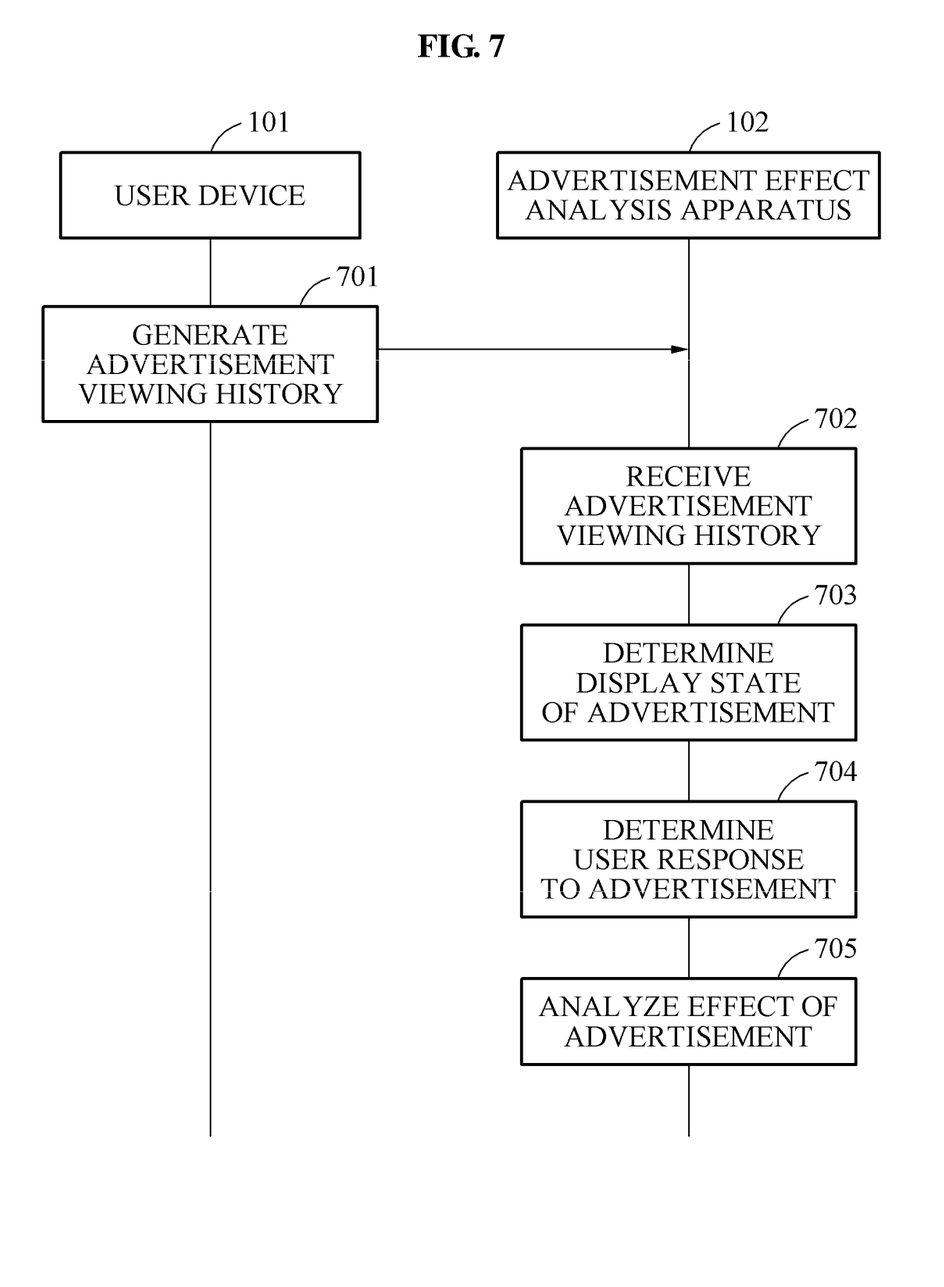
FIG. 7 is a flowchart illustrating an advertisement effect analysis method according to an embodiment.

FIG. 7 is a flowchart illustrating an advertisement effect analysis method according to an embodiment.

In operation 701, the user device 101 may generate an advertisement viewing history of a user. That is, the user device 101 may identify that an advertisement is displayed to the user as the user turns on the user device 101. Accordingly, the user device 101 may transmit an advertisement viewing history of each advertisement that the user views to the advertisement effect analysis apparatus 102 in real time.

In operation 702, the advertisement effect analysis apparatus 102 may collect the advertisement viewing history of the user from the user device. Here, the advertisement viewing history may include an ID for identifying an advertisement, an advertisement start time, an advertisement end time, and input information input by the user.

In operation 703, the advertisement effect analysis apparatus 102 may determine a display state of an advertisement based on the collected advertisement viewing history and a user reaction based on the display state. The display state of the advertisement may include a display size of the advertisement displayed on the screen of the user device and a display time based on the display size of the advertisement. When the displayed advertisement is selected by the user, the advertisement effect analysis apparatus may display the advertisement in the enlarged display size by adjusting an advertising area on the screen on which the advertisement is displayed.

The advertisement effect analysis apparatus may determine the display size and advertisement display degree according to the display time based on the screen size of the user device and the advertisement playback time.

In operation 704, the advertisement effect analysis apparatus may determine a user response to the advertisement using input information to manipulate the played advertisement according to the display state. The advertisement effect analysis apparatus may determine a user response according to a preset range using input information representing a variation in sound based on the sound output from the played advertisement.

In operation 705, the advertisement effect analysis apparatus may analyze an effect of the advertisement in view of a weighting based on importance of the display state of the displayed advertisement and the user response according to a result.

An advertisement effect analysis method according to an aspect may analyze an advertisement viewing history to analyze user involvement in a displayed advertisement, thereby providing an objective result based on reliable information on the advertisement displayed to the user.

The present disclosure may analyze an effect of an advertisement by applying a weighting based on importance of a display size of the advertisement, a display time, and a user response according to the advertisement viewing history, thereby analyzing the comprehensive effect of the advertisement based on a form and playback process of the advertisement displayed to the user.

The methods according to the embodiments of the present disclosure may be realized as program instructions implemented by various computers and be recorded in non-transitory computer-readable media. The media may include, alone or in combination, the program instructions, data files, data structures, and the like. The program instructions recorded in the media may be designed and configured specially for the present disclosure or be known and available to those skilled in computer software.

While the present disclosure has been described with reference to a few example embodiments and the accompanying drawings, the present disclosure is not limited to the described example embodiments. Instead, it would be appreciated by those skilled in the art that various modifications and variations can be made from the foregoing descriptions.

Therefore, it should be noted that the scope of the present disclosure is not limited by the illustrated embodiments but defined by the appended claims and their equivalents.

What is claimed is:

1. A method of analyzing an advertisement effect performed by an advertisement effect analysis apparatus, the method comprising:
   receiving, from a user device, an advertisement viewing history of a user of the user device;
   determining a display state of an advertisement based on the received advertisement viewing history, wherein the display state of the advertisement comprises a display size of the advertisement displayed on a screen of the user device and a display duration of the advertisement in the display size, the display size being at least one of an advertising area size and enlarged advertising area size;
   determining a display degree of each display state by multiplying the display size by the display duration of the display state;
   determining a user response for each display state; and
   analyzing an effect of the advertisement displayed to the user based on the display state, the display degree of the display state, and the user response for the display state.

2. The method of claim 1, wherein the user response is input through a remote controller which controls the user device.

3. The method of claim 1, wherein the determining the display state comprises enlarging the display size of the advertisement by adjusting the advertising area on the screen on which the advertisement is displayed when the displayed advertisement is selected by the user.

4. The method of claim 1, wherein the display degree is based on the display size and the display duration with respect to a size of the screen of the user device and a total play time of the advertisement.

5. The method of claim 1, wherein the user response is determined based on input information for manipulating the advertisement played according to the display state.

6. The method of claim 5, wherein the user response is determined according to a preset range based on input information indicating a variation in sound based on the sound output from the played advertisement.

7. The method of claim 1, wherein the analyzing comprises analyzing the effect of the advertisement based on a weighting according to an importance of the display state of the advertisement and the user response.

8. A method of analyzing an advertisement effect performed by an advertisement effect analysis apparatus, the method comprising:
   receiving, from a user device, an advertisement viewing history information of a user of the user device;
   determining a display state of an advertisement displayed on a screen of a user device based on the received advertisement viewing history, wherein the display state of the advertisement comprises a combination of a display size of the advertisement displayed on a screen of the user device and a display duration of the advertisement in the display size, the display size being at least one of an advertising area size and enlarged advertising area size;
   determining a display degree of each display state by multiplying the display size by the display duration of the display state;
   determining a user response indicating involvement of the user in the advertisement for each display state of the advertisement; and
   analyzing an effect of the advertisement displayed to the user based on the display state, the display degree of the display state, and the user response for the display state.

9. The method of claim 8, wherein the user response is input through a remote controller which controls the user device.

10. The method of claim 8, wherein the determining of the display state comprises enlarging the display size of the advertisement by adjusting the advertising area on the screen on which the advertisement is displayed when the displayed advertisement is selected by the user.

11. The method of claim 8, further comprises the display degree is determined based on the display size and the display duration with respect to an entire size of the screen of the user device and a total play time of the advertisement.

12. The method of claim 8, wherein the user response is determined based on input information for manipulating the advertisement played according to the display state.

13. The method of claim 12, wherein the user response is determined according to a preset range based on input information indicating a variation in sound based on the sound output from the played advertisement.

14. The method of claim 8, wherein the analyzing of the user response comprises analyzing the effect of the advertisement based on a weighting according to an importance of the display state of the advertisement and the user response.

15. An apparatus for analyzing an advertisement effect, the apparatus comprising:
    a receiver configured to collect an advertisement viewing history of a user from a user device;
    a processor configured to:
        determine a display state of an advertisement based on the advertisement viewing history, wherein the display state of the advertisement comprises a display size of the advertisement displayed on a screen of the user device and a display duration of the advertisement in the display size, the display size being at least one of an advertising area size and enlarged advertising area size,
        determine a display degree of each display state by multiplying the display size by the display duration of the display state;
        determine a user response for each display state, and analyze an effect of the advertisement displayed to the user based on the display state, the display degree of the display state, and the user response for the display state; and
    a transmitter configured to transmit the analyzed effect of the advertisement to an advertiser.

16. The apparatus of claim 15, wherein the processor determines a first display state of the advertisement based on the advertisement being displayed in the advertising area size and a first display duration in the advertising area size and a second display state of the advertisement based on the advertisement being displayed in the enlarged advertising area size and a second display duration in the enlarged advertising area size.

17. The apparatus of claim 15, wherein the processor determines the user response to the advertisement based on input information for manipulating an advertisement played according to the display state.

18. The method of claim 8, further comprising:
    determining the display degree by using the following equation:

the display degree=(the advertisement displayed in the advertising area size×the duration time in which the advertisement is displayed in the advertising area size)+(the advertisement displayed in the enlarged advertising area size×the duration time in which the advertisement is displayed in the enlarged advertising area size)/(size of the screen of the user device×total duration of the advertisement), wherein the advertising area size is a portion of the screen of the user device and the enlarged advertising area size is one of the screen of the user device or another portion of the screen of the user device larger than the advertising area size.

19. The method of claim 18, further comprising:
    determining an initial sound volume of the user device prior to playing of the advertisement,
    wherein the user response comprises at least one manipulation of sound volume with respect to the determined initial sound volume such that different weights are assigned to the user response depending on the determined initial sound volume, and
    wherein the advertising area size depends on an aspect ratio of the screen of the user device.

20. The method of claim 19, wherein the analyzing the effect of the advertisement is based on a following equation:

the effect of the advertisement=$\Sigma_{i=1}^{N} a_i \times \text{Index}_i$, wherein a is the user, i is the advertisement and index is at least one of the determined display state and the determined user response of the user a with respect to the advertisement i.

21. The method of claim 20, further comprising:
    transmitting to the user device new advertisement content, selected from among a plurality of advertisement contents based on the analyzed effect of the advertisement.

* * * * *